UNITED STATES PATENT OFFICE.

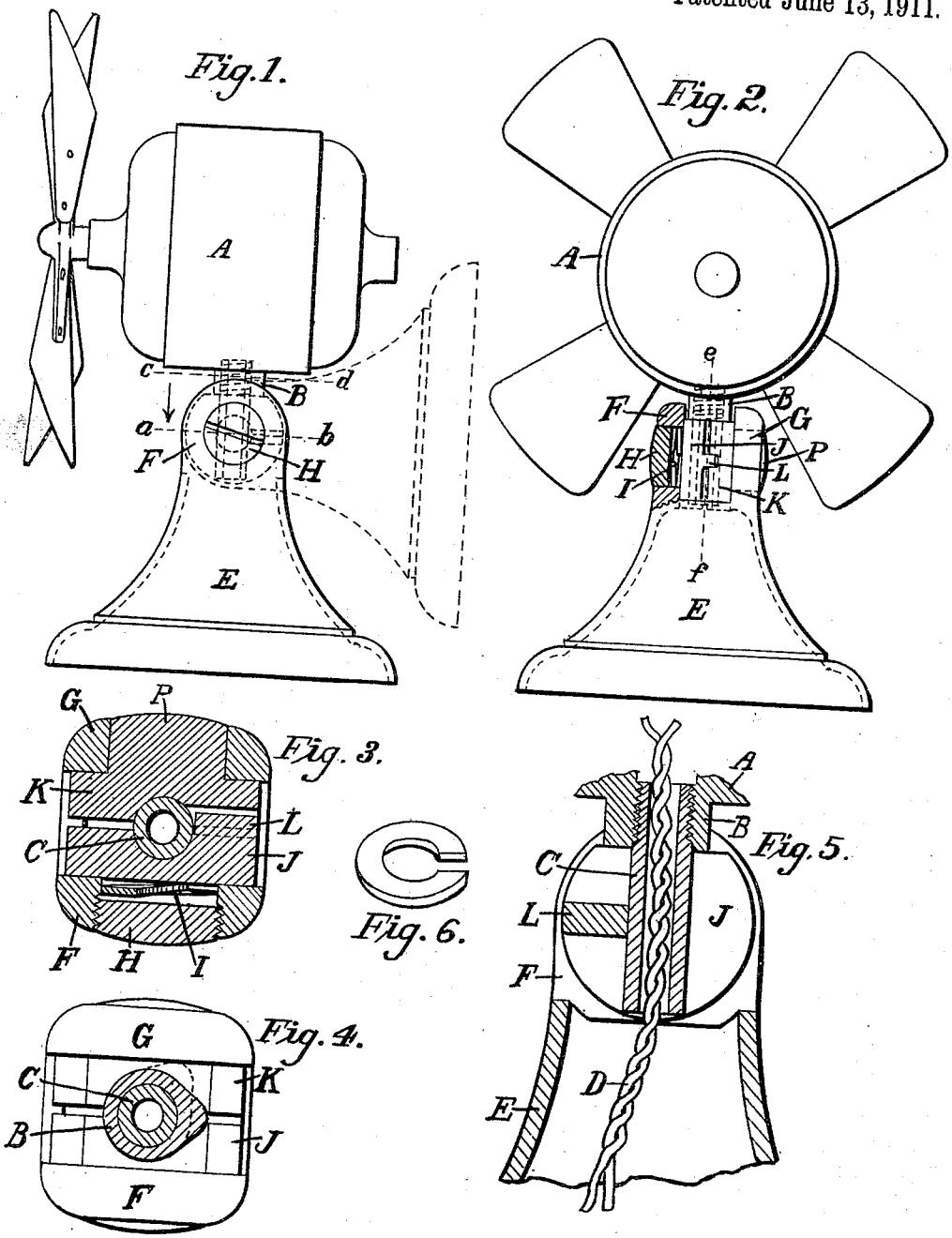

EDGAR W. BROWN, OF DAYTON, OHIO.

ADJUSTABLE SUPPORT FOR ELECTRIC FANS.

994,904.

Specification of Letters Patent. Patented June 13, 1911.

Application filed January 24, 1910. Serial No. 539,847.

*To all whom it may concern:*

Be it known that I, EDGAR W. BROWN, a citizen of the United States, residing at Dayton, county of Montgomery, and State of Ohio, have invented certain new and useful Improvements in Adjustable Supports for Electric Fans, of which the following is a specification, reference being had to the accompanying drawings, forming a part of same.

My invention relates more particularly to means for altering and adjusting the position of the body of a fan motor in reference to its support, for the purpose of altering the direction in which the air is thrown.

In the drawings, Figure 1 is a side elevation of a fan motor embodying the features of my invention. Fig. 2 is a rear elevation of the same. Fig. 3 is a cross-section, taken on the line *a b*, Fig. 1, looking in the direction indicated by the arrow. Fig. 4 is a cross-section taken on the line *c d*, Fig. 1, looking in the direction indicated by the arrow. Fig. 5 is a vertical cross-section taken on the line *e f*, Fig. 2. Fig. 6 is a view of a washer-like spring, used for a purpose hereinafter described.

In the several views, in which like characters refer to similar parts, A is the motor body of the fan motor, to which is cast the lug B, in which is securely fastened the stud C, which is made hollow to provide a passage for the wires D, from the base E, to the motor body A. The upper extremity of the base E is divided by an opening, into the sides F and G, between which are fitted the members J and K, which are hollowed out to receive the stud C. Extending outwardly from the member K is an axle-like projection P, which is fitted in an opening in the side G, and adapted to turn therein. About this projection as an axis, the fan motor body can be tilted or turned through various angles in a vertical plane. About the stud C as an axis, the fan motor body can be turned through various angles to the right or left, and by combining or using both of these movements, the air can be directed to any angle in any plane. The tongue L, extending from member J and fitting a corresponding groove in member K, aids in maintaining the said member J in its proper position. The lug B is lengthened out on one side to act as a stop, in order to prevent twisting the wires. This is best shown in Fig. 4. In the side F of the upper extremity of the base is an opening in which is screwed the screw plug H. Between said screw plug H and the member J is placed a washer-like spring I, which is shown separately in Fig. 6. The screw plug H compresses the spring I and creates an elastic pressure which compresses the stud C between the members J and K, which members are also compressed between the said spring I and the side G of the base. The tension of this compression can be adjusted by screwing the screw plug H in or out. This tension can be increased to the point where it would be impossible to turn the motor body, but for general use this tension would be adjusted to such a point so that the motor body could be readily turned with the hand and at the same time be firmly maintained in the new position. In Fig. 1, where the dotted outline of the base is shown, it will be noted how readily this fan motor can be changed to the bracket type of fan, for the purpose of fastening same to the wall or other vertical surface.

Fans now in use, which are adjustable to different angles are, I believe, without exception held in position with screws or nuts of one kind or another, and it is necessary to loosen and tighten the same every time it is required to change the direction of the breeze. In my invention, a pressure of the hand is all that is necessary to adjust the motor body to a new position and this adjustment is controlled and the position is maintained by an elastic pressure which is adjustable and acts automatically.

Having described my invention, I claim:

1. In an electric fan, a motor body, a stud secured thereto, members fitted to said stud, a support in which said members are held and means for clamping both said stud between said members and said members in said support.

2. In an electric fan, a motor body, a stud secured thereto, members fitted to said stud, a base or support in which said members are held, means for producing an elastic pressure adapted to compress said stud between said members and to compress said members in said base or support.

3. In an electric fan, a motor body, a stud secured thereto, members fitted to said stud, and a base or support in which said members are held; means for producing an elastic pressure adapted to compress said stud between said members and also adapted to compress said members in said base; means for adjusting the tension of said elastic pressure.

4. In a device of the character specified, the combination with a supporting member, and a movable body, of clamping members forming a pivot upon which said movable body may be turned to various angles in a vertical plane, means forming an axis upon which said movable body may be turned in a complete circle in a plane at right angles to said vertical plane, and means adapted to exert a yielding pressure upon the clamping members to maintain said movable body at any desired angle relative to the supporting member and to permit the position of said movable body to be changed without changing the tension of the means for supplying the yielding pressure.

5. In a device of the character specified, the combination with a movable body, and a supporting member therefor, of clamping members mounted in said supporting member, said clamping members providing a pivot upon which said movable body may be moved through a vertical plane, a stud interposed between said clamping members and said movable body and forming a pivot whereon said movable body may be moved through a plane at right angles to said vertical plane, and means adapted to exert a yielding pressure on said clamping members to maintain said movable body at any desired angle relative to said supporting member.

6. In a device of the character specified, the combination with a movable body, and a supporting member therefor, of clamping members mounted in said supporting member, said clamping members providing a pivot upon which said movable body may be moved through a vertical plane, a stud projected from said movable body and engaged by the clamping members, said stud providing a pivot upon which said movable body may be moved through a plane at right angles to said vertical plane, and means adapted to exert a yielding pressure to maintain said movable body at any desired angle relative to said supporting member.

7. The combination with a motor body, and a supporting base the upper extremity of which is provided with an opening inclosed by a series of abutments, of an apertured stud projected from the motor body and lying within said opening, clamping members arranged between said stud and said abutment, and a resilient member adapted to clamp the stud between the clamping members and to apply elastic pressure which is adapted to hold the motor body in a position relative to the supporting base without changing the tension of the elastic pressure.

EDGAR W. BROWN.

Witnesses:
ANNA MITTENDORF,
F. C. MUNZ.

---

Copies of this patent may be obtained for five cents each, by addressing the "Commissioner of Patents, Washington, D. C."